U. H. SHOCKLEY.
Hay-Elevators.
No. 152,525.  Patented June 30, 1874.
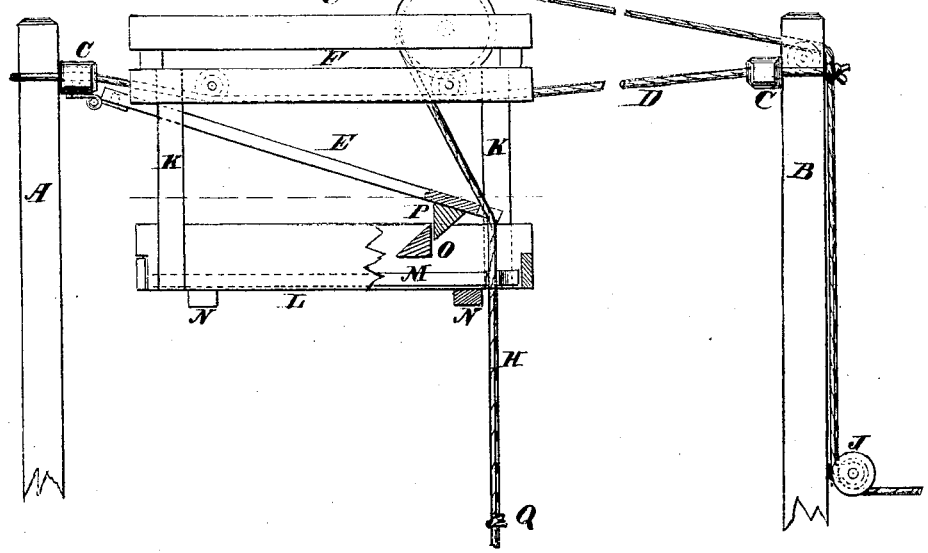
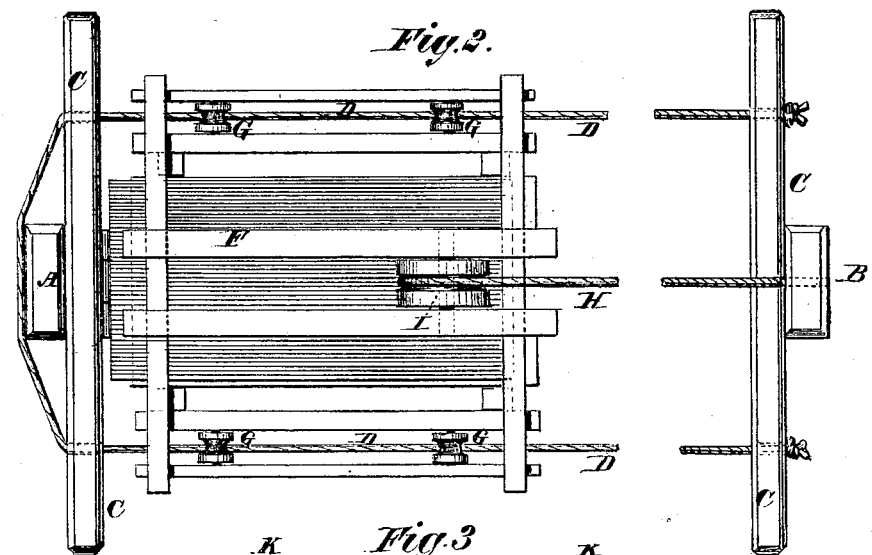
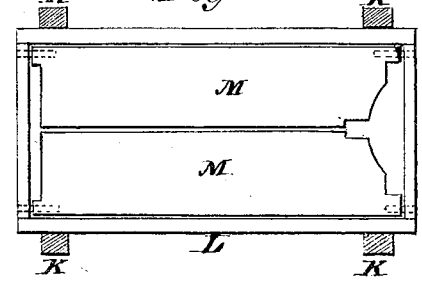
WITNESSES.  INVENTOR.
  W. H. Shockley
BY
ATTORNEYS.

UNITED STATES PATENT OFFICE.

UEL H. SHOCKLEY, OF RINGVILLE, KANSAS.

IMPROVEMENT IN HAY-ELEVATORS.

Specification forming part of Letters Patent No. 152,525, dated June 30, 1874; application filed November 1, 1873.

*To all whom it may concern:*

Be it known that I, UEL H. SHOCKLEY, of Ringville, in the county of Shawnee and State of Kansas, have invented a new and useful Improvement in Hay Carrier and Elevator, of which the following is a specification:

My invention is an improvement in the class of hay-elevators in which a carriage is arranged to travel horizontally and carry a bundle of hay suspended by the cord, by which movement is imparted to the carriage. The improvement relates to the construction and arrangement of parts, whereby, when the carriage has reached the place of deposit for the hay, the suspending-rope may be swung laterally to free it from hinged doors or clamps, and allow the load or bundle to descend, all as hereinafter described.

In the drawing, Figure 1 is a side elevation. Fig. 2 is a top or plan view, and Fig. 3 is a section looking down from the line $x\ x$ of Fig. 2.

Similar letters of reference indicate corresponding parts.

A and B are two posts, which are temporarily set in the ground or otherwise supported. To each of these posts a horizontal beam, C, is attached. D is a rope on the two opposite sides, which is attached to the beams C C, as seen in the drawing. E is a board or leaf, which is hinged to the lower side of one of the beams C. F is a carriage, which is supported, and is moved on the two ropes D D. G are grooved rollers or wheels, confined by means of arbors to the carriage, which rest on the ropes and allow the carriage to be moved back and forth on the ropes. H is the hoisting-rope, to the end of which the hay-fork is attached. This rope is attached to the carriage, and passes over the grooved pulley I, and extends to a pulley in the upper end of the posts B, and then down parallel with the post to a convenient distance from the ground, where it passes around a snatch-block to a pulley for attaching a horse, as seen at J. Suspended from the upper frame of the carriage by the hangers K is a box-platform, L, in the bottom of which are two doors, M M, which work on pivots in their ends, as indicated in dotted lines in Fig. 3. N N are cross-pieces on the bottom of this box, upon which these doors rest when they are closed or down. O is a bar of triangular form, placed across the box a short distance above the doors, which acts as a stop to limit the upward movement of the doors, and which holds the carriage in position. On the under side of the hinged leaf E is a triangular piece, P, which latches over the bar O. (See Fig. 1.) Q is a knot in the hoisting-rope H above the fork. When the fork is loaded the hay is elevated till the knot Q strikes the end of the leaf E. The hinged doors rise and allow the knot to pass. The piece R hooks over the bar O, as seen in Fig. 1.

When the knot strikes the end of the leaf E it raises the leaf and releases the carrier, which may be moved horizontally any distance, according to the length of the ropes D D.

The two doors M close by their own gravity, and the knot rests thereon, so that the fork-load of hay is supported, and may be dumped in any desired position. The doors M M are cut out at the ends, from which the fork-rope is suspended, as is clearly shown in Fig. 3, for the purpose of allowing said rope to be disengaged from the doors when the place of deposit for the hay is reached. This is effected by drawing or pushing the fork-rope in a direction to cause the knot to slide off the ends of the boards M.

When the hay is discharged the fork is carried back to be loaded again by the horse being turned around and made to travel back where he started from with the load. When the carrier then goes back the end of the leaf pushes the knot off the doors M M, and allows the fork to descend for a new load.

Having thus described my invention, I claim as new and desire to secure by Letters Patent—

The carriage provided with the central pulley I and hinged doors M M, arranged to fold toward each other into a horizontal position, and having their contiguous ends notched, as shown, the hinged catch-bar E, and knotted fork-rope H, all combined to operate as specified.

UEL H. SHOCKLEY.

Witnesses:
L. A. CAMPBELL,
L. M. ARNOLD.